United States Patent [19]
Schläfer et al.

[11] 3,865,543
[45] Feb. 11, 1975

[54] PROCESS FOR DYEING OR PRINTING POLYAMIDE OR POLYURETHANE FIBRES WITH ANTHRAQUINONE-AZO DYESTUFFS

[75] Inventors: Ludwig Schläfer, Sulzbach/Taunus; Karl-Heinz Krell, Kelkheim/Taunus, both of Germany

[73] Assignee: Hoechst Aktiengesellschaft, Frankfurt am Main, Germany

[22] Filed: Feb. 29, 1972

[21] Appl. No.: 230,473

Related U.S. Application Data

[63] Continuation of Ser. No. 18282, March 10, 1970.

[30] Foreign Application Priority Data

Mar. 20, 1969  Germany............................ 1914192

[52] U.S. Cl............................ 8/39, 8/173, 8/178 R, 8/178 E, 117/12, 117/62, 117/138 D, 117/138.8 N, 260/205, 260/206, 260/207.1, 260/192

[51] Int. Cl....... C09b 1/00, D06p 1/20, D06p 1/24, D06p 3/24

[58] Field of Search ....... 8/39, 41, 176, 173, 178 N, 8/178 E; 260/192, 205, 206, 207.1, 192; 117/12, 62, 138.8 D, 138.8 N

[56] References Cited
UNITED STATES PATENTS
2,145,954  2/1937  Semple et al. ...................... 260/192
2,663,612  12/1953  Gibson.................................. 8/176

OTHER PUBLICATIONS
Wingate ED., Fairchild's Dict. of Text., 1967, p. 450.

Primary Examiner—William R. Trenor
Attorney, Agent, or Firm—Curtis, Morris & Safford

[57] ABSTRACT

A process for the dyeing or printing of polyamide or polyurethane fibres, wherein at a pH-range between about 8 and 1 the said fibrous materials are
a. dyed or printed at a temperature between about 60°C and about 130°C or
b. padded and subsequently thermofixed at a temperature between about 150°C and about 230°C.

with a water-soluble green to olive-green anthraquinone dyestuff of the formula

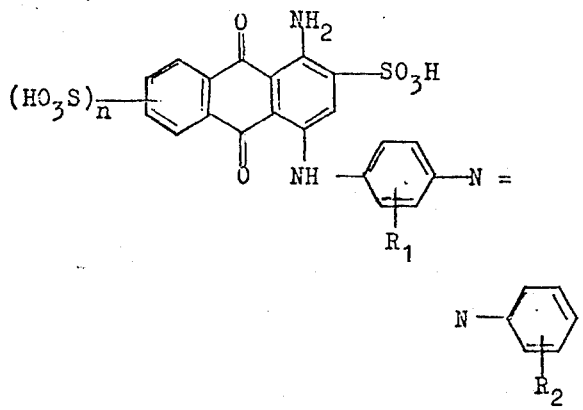

in which $R_1$ represents hydrogen, hydroxyl, lower alkyl, lower alkoxy, phenoxy, amino, acetylamino, benzoylamino, benzene-sulfonylamine, chlorine or bromine, and $R_2$ represents hydrogen, lower alkyl, lower alkoxy, chlorine, bromine, carboxyl or sulfonic acid group, and n is 0 or 1.

3 Claims, No Drawings

PROCESS FOR DYEING OR PRINTING POLYAMIDE OR POLYURETHANE FIBRES WITH ANTHRAQUINONE-AZO DYESTUFFS

This application is a continuation application of pending application Ser. No. 18,282 filed Mar. 10, 1970, now abandoned.

The present invention relates to a process for dyeing or printing polyamide or polyurethane fibres, wherein at a pH-range between about 8 and 1, preferably between about 7 and about 3, the said fibrous materials are a. dyed or printed at a temperature between about 60°C and about 130°C or b. padded at room temperature or at an elevated temperature, suitably between about 20° and about 60°C, and subsequently thermofixed at a temperature between about 150°C and about 230°C, preferably between about 180°C and about 220°C, with a water-soluble, green to olive-green anthraquinone-azo dyestuff of the general formula (1)

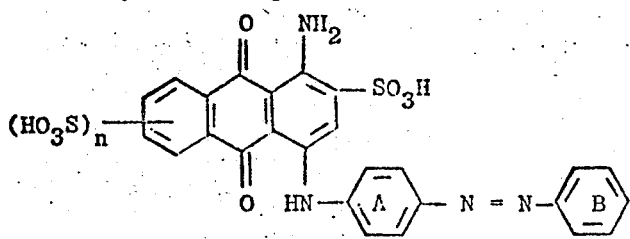

in which the benzene nucleus A may contain substituents usually linked to azo dyestuffs, for example lower alkyl groups, such as methyl, ethyl or propyl groups, the hydroxyl group or alkoxy groups, for example methoxy or ethoxy groups, the phenoxy or amino group, acylamino groups, for example the acetyl, benzoyl or benzene-sulfonylamino group, and halogen atoms, for example chlorine or bromine atoms, and the benzene nucleus B may contain lower alkyl and alkoxy groups and halogen atoms, for example chlorine or bromine atoms, as well as one or more water-solubilizing groups, such as the carboxy and/or the sulfonic acid group, and $n$ represents the number 0 or 1.

Optionally, the dyestuffs may be used in combination with auxiliary agents usual for dyeing, padding and printing processes.

The dyestuffs are dissolved in the dyeing and padding baths or in the printing pastes. They have a very good build-up on the cited fibrous materials and then yield green to olive-green dyeings or prints having great intensity and very good fastnesses to processing and to use, especially to light and to wet processing, the latter concerning, above all, the fastness to washing at 60°C according to DIN 54 010. Further, the said dyestuffs show very good affinity and levelling power when applied on the aforementioned fibrous materials.

When other known polyamide dyestuffs are applied, the green to olive-green shades obtained on polyamide or polyurethane fibres by using the dyestuffs as defined above can be obtained by combination dyeing with several single dyestuffs only. As it is generally known, in these cases blocking may occur, which often complicates the use of such dyestuff combinations in continuous dyeing processes or even makes it impossible. Further, combination dyeings are often inferior to dyeings with homogeneous dyestuffs with regard to fastness to wet processing. The fastness properties of the polyamide dyeings obtained by means of the process of the invention are far superior to those obtained when the dyestuffs are applied on wool.

The anthraquinone-azo dyestuffs of the process of the invention may be prepared by condensation of 1-amino-4-bromo-anthraquinone-2-sulfonic acid or of their mono- or disulfonic acid derivatives with an amino-azo-dyestuff of the general formula (2)

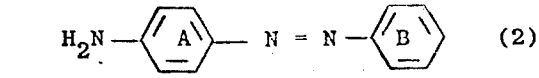

the benzene nucleus of which may be substituted as indicated above, or by condensation of the cited 1-amino-4-bromo-anthraquinone-sulfonic acids with a suitable aromatic amine of the formula (3)

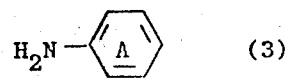

and further reaction of the primary condensation product with the dyeing salt of an aromatic amine of the formula (4)

in which the benzene nuclei may be substituted as indicated above.

The following examples illustrate the invention; the parts are by weight unless otherwise stated.

EXAMPLE 1

300 mg of the anthraquinone-azo dyestuff of the formula

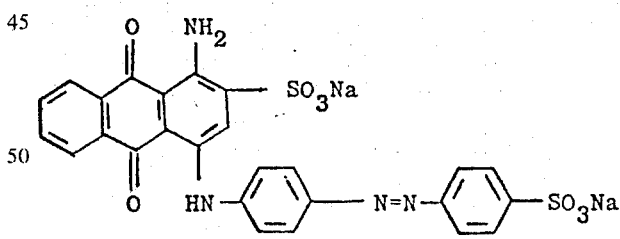

are dissolved in 300 ml of water while adding 100 mg of glacial acetic acid. 10 g of a fabric made from polyamide fibres (polyamide-6) are introduced into this bath at 20° to 30°C. While thoroughly moving the fabric, the bath is then heated to 70°C within 45 minutes. At this temperature, the dyestuff is completely absorbed by the fabric within 20 to 30 minutes. The total time of the dyeing process is 60 minutes, while thoroughly moving the goods, which are subsequently rinsed and dried. A deep and even green dyeing is obtained.

When instead of the fabric made from polyamide fibres, a fabric of polyurethane fibres is used and the process is carried out as described above, a deep and even green dyeing is also obtained.

The fastness properties of the dyeings obtained, such as the fastness to light and to wet processing, are very good (a fastness test to washing at 60°C according to DIN 54 010 of a corresponding wool dyeing shows a considerable decrease in tinctorial strength in the latter case).

It is possible to imitate the shade of the dyeing obtained in this way on polyamide fabrics by mixtures of several known polyamide dyestuffs, but in this case blocking effects and heavy discolorations of the dyeings obtained from the exhaust test are to be expected which complicate very much any continuous dyeing process. Also the fastnesses to wet processing of these combination dyeings are generally less than those obtained by using the homogeneous dyestuff of this example.

When, for example, instead of the aforementioned homogeneous anthraquinone-azo dyestuff, a mixture of 300 mg of the dyestuff of Colour Index no. 61590 (Acid Green 44), 300 mg of the dyestuff of Colour Index no. 23270 (Acid Yellow 68) and 250 mg of a dyestuff of the formula

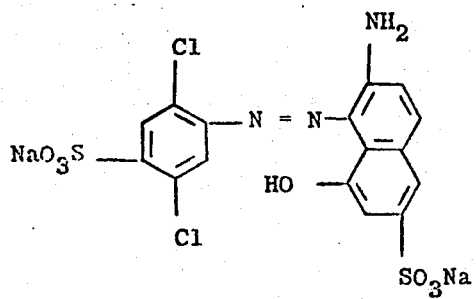

is used, a similar-shaded dyeing results, but from the exhaust test only a dull bordeaux-red is obtained.

When, instead of the dyestuff of this Example 1, a mixture of 300 mg of the dyestuff of Colour Index no. 61590 (Acid Green 44), 350 mg of the dyestuff of Colour Index no. 23270 (Acid Yellow 68) and 70 mg of the dyestuff of Colour Index no. 24800 (Acid Red 154) is used, an olive-green dyeing results and from the exhaust test a dark brown shade is obtained.

When, instead of the homogeneous green anthraquinone-azo dyestuff of this Example 1, a mixture of 160 mg of the dyestuff of Colour Index no. 62155 (Acid Green 111), 400 mg of the dyestuff of Colour Index no. 23270 (Acid Yellow 68) and 20 mg of the dyestuff of Colour Index no. 24800 (Acid Red 154) is used, an olive-green dyeing results, and from the exhaust test a yellow-brown shade is obtained.

EXAMPLE 2

A neutral padding bath is prepared of 300 ml of water of 30°C and 100 mg of an anthraquinone-azo dyestuff of the formula

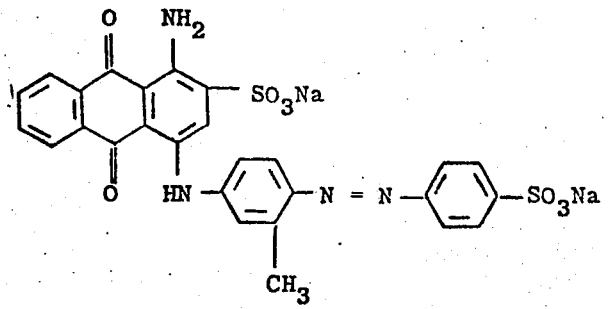

After adding 10 g of a fabric made from polyamide fibres (polyamide-6), the bath is heated to 70°C within 30 minutes, and dyeing is carried out for 60 minutes at this temperature, while moving the goods several times. The bath is exhausted more slowly than in the process described in Example 1, but also in this case the bath is completely exhausted at the end of the dyeing time. After a thorough rinsing in warm water, the goods are dried. A deep and even green dyeing is obtained which shows very good fastness to washing.

When instead of the aforementioned dyestuff a dyestuff of the formula

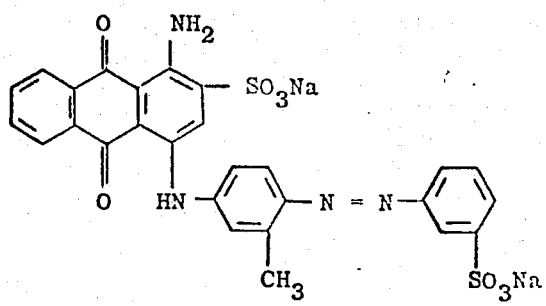

is used and the same process as described in this Example is carried out, a deep and even dyeing of a more pure shade is obtained.

EXAMPLE 3

10 g of a fabric made from polyamide fibres (polyamide-6) are treated for 60 minutes, while continously moving, in a pressure vessel at 130°C with a dyeing bath consisting of 800 mg of the anthraquinone-azo dyestuff of Example 1 and 200 mg of 85 percent formic acid. After thorough rinsing in hot water, the goods are dried. The fabric shows a very intense dark green dyeing having the good fastness properties indicated in Example 1.

EXAMPLE 4

A fabric made from polyamide fibres (polyamide 66) is impregnated on the foulard with a solution which contains per litre 60 g of a dyestuff of the formula

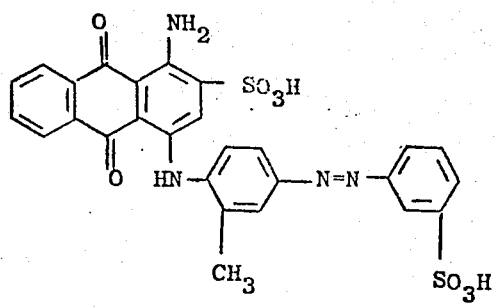

90 g of polyethyleneglycol (molar weight 400) as well as 90 g of di-ethyleneglycol-mono-ethyl-ether. After predrying, thermofixing is effected within 100 seconds at 210°C. Subsequently, the dyed fabric is washed, rinsed and dried. A deep green, even and streak-free dyeing is obtained having a very good fastness to light and to washing.

EXAMPLE 5

50 g of the mixture of anthraquinone-azo-dyestuffs of the formulae

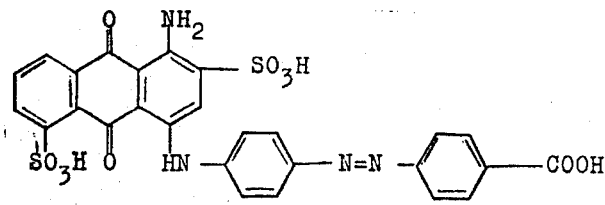

and

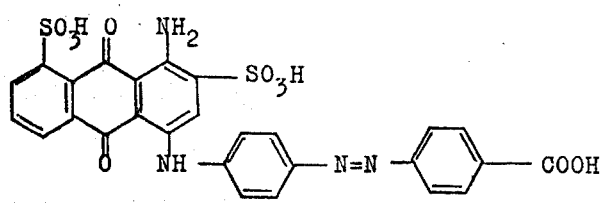

are dissolved in 250 g of boiling water. The solution so obtained is stirred into 500 g of a thickener consisting of 3 parts of water and 1 part of crystal rubber and 20 g of ammonium sulfate. The whole is made up to 1000 g by adding further thickener. The polyamide or polyurethane fabric printed with this printing paste is steamed for 20 minutes without overpressure, subsequently washed and finished. A deep green print having very good fastness to washing is obtained.

When instead of the aforementioned dyestuff mixture the same amount of a dyestuff of the formula

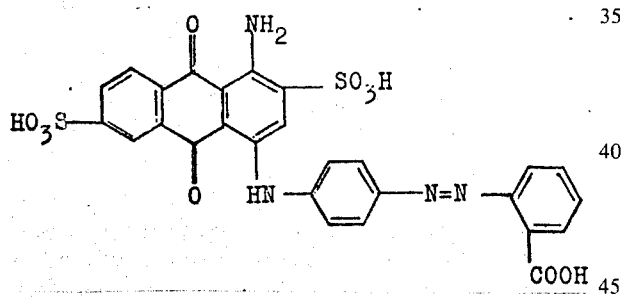

is used and the procedure as above is maintained, a print of the same shade, also having good fastness to washing, is obtained.

EXAMPLE 6

50 g of a dyestuff of the formula

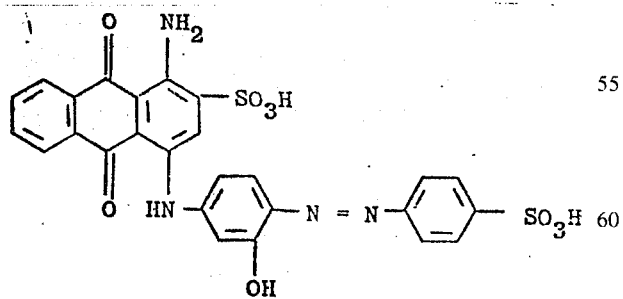

dissolved in 250 g of boiling water, are stirred into 500 g of a crystal rubber thickener. After adding 20 g of ammonium sulfate, the whole is made up to 1000 g by adding water. A polyamide or polyurethane fabric is printed with this paste and then steamed for 5 minutes at 1 atmosphere/gage. Subsequently, the printed fabric is washed and finished. A deep olive print having good fastness to washing and to light is obtained.

When instead of the aforementioned dyestuff the same amount of a dyestuff of the formula

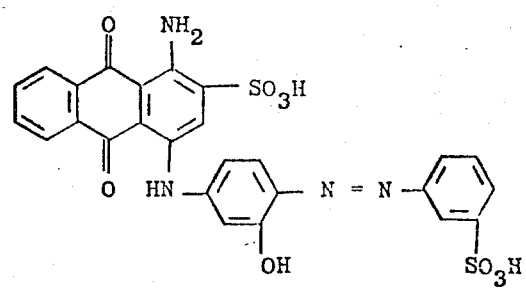

is used and the above described procedure is maintained, a green print of a slightly clearer and greener shade having the same good fastness to washing and to light is obtained.

When instead of the aforementioned dyestuff the same amount of a dyestuff of the formula

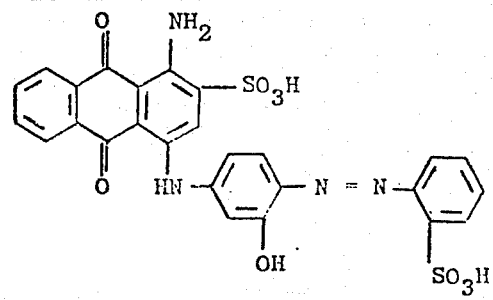

is used and the above described procedure is maintained, a green dyestuff of a slightly clearer and greener shade having good fastness to washing and to light is obtained.

We claim:
1. A process for coloration of synthetic polyamide fibers or polyurethane fibers which consists essentially of (a) dyeing said fibers in a dyebath at a temperature of about 60°C. to about 130°C. or (b) printing said fibers with a printing paste and thereafter steaming the printed fibers with steam at a pressure of about atmospheric to about 1 atmosphere gauge, said dyebath and printing paste having a pH between about 1 and about 8 and containing a water-soluble green to olive-green anthraquinone dyestuff of the formula

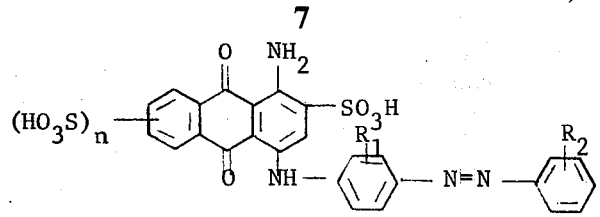

wherein $R_1$ is hydrogen, hydroxyl, lower alkyl, lower alkoxy, phenoxy, amino, acetylamino, benzoylamino, benzenesulfonylamino, chlorine or bromine, $R_2$ is hydrogen, lower alkyl, lower alkoxy, chlorine, bromine, carboxyl or sulfonic acid, and $n$ is 0 or 1.

2. A process according to claim 1 wherein said pH is between about 3 and about 7.

3. A process according to claim 1 wherein said dyeing (a) is at a temperature of about 100°C. to about 120°C.

* * * * *